United States Patent Office 3,733,366
Patented May 15, 1973

3,733,366
PREPARATION OF WHITE BROMINATED BIPHENYL
George A. Burk, Bay City, Mich., assignor to The Dow Chemical Company, Midland, Mich.
No Drawing. Filed Dec. 21, 1970, Ser. No. 100,349
Int. Cl. C07c 25/18
U.S. Cl. 260—649 D        7 Claims

ABSTRACT OF THE DISCLOSURE

It has been found that discolored brominated biphenyl which is prepared by brominating biphenyl with bromine or bromine chloride in the presence of a Friedel-Crafts catalyst is decolorized by heating at a temperature between about 100° and the temperature at which the product discolors.

BACKGROUND OF THE INVENTION

The bromination of biphenyl by contacting bromine or bromine chloride with biphenyl in the presence of a Friedel-Crafts catalyst is well known. Such brominations form a colored product. This usually salmon colored product, however, is not desirable because a colorless product is required for many applications.

It is also known that halogenated hydrocarbons have a tendency to be thermally unstable. The reactions to prepare the compounds are usually conducted at temperatures below 100° C., and the product is generally purified by crystallization from various solvents in which the impurities are more soluble than the brominated product.

SUMMARY OF THE INVENTION

It has now been found according to the present invention that brominated biphenyl prepared by contacting biphenyl with bromine or bromine chloride in the presence of a Friedel-Crafts catalyst can be made substantially colorless by heating the product to a temperature between about 100° C. and the temperature at which the product discolors for the period of time required to obtain a product of the desired whiteness. By this technique, a white brominated biphenyl is obtained without the necessity of crystallizing the product from a solvent.

The crux of the discovery of the invention is that crude brominated biphenyl prepared in the manner described is made colorless by heating. Thus, a simple and economical method of obtaining a desirable product has been discovered.

The invention may be carried out by numerous techniques which are generically known in the art. The crystalline product may be isolated and heated to the temperatures specified or the product may be dissolved or slurried in an inert solvent and heated. By either of these methods or by other conventional methods of accomplishing the heating, a desirable white product is obtained.

The most important and critical aspect of the process of the invention is the temperature at which the product is heated. As noted above, this temperature may range between about 100° C. and the temperature at which the brominated product discolors. The upper limit is dependent upon the particular brominated biphenyl that is treated, impurities present in the specific product and the length of time over which the product must be heated. More specifically, brominated biphenyl containing more bromines are usually able to withstand higher temperatures, whereas those containing fewer bromines cannot be heated to equally high temperatures. The second factor in this upper limit, the presence of impurities, varies widely and can only be determined by the particular reaction with its many variables. Thus, the effect of these extraneous impurities on the whiteness of the product versus the temperature of the heating cannot be precisely defined. The third factor in determining the temperature employed is the length of time over which the product must be heated to obtain a desirable whiteness. As longer times are required, lower temperatures must be employed. Although these factors may change the upper limit significantly, an upper temperature limit of about 160° C. is usually acceptable. This upper limit would tend to minimize the risk of discoloration while at the same time maximizing the efficiency of the process in producing a white product. The preferred temperature range within these limits is about 110° to about 150° C. Such a range gives a product having very desirable whiteness in a short period of time.

The other parameters of the invention are of lesser significance than the temperature. Most of these variables are obvious corollaries to the invention. For example, the duration of the heating may vary widely but is continued until a product of desirable whiteness is obtained. Too long of a period of heating at a high temperature, of course, may cause a degeneration in the color properties of the brominated biphenyl.

The brominated biphenyl is prepared by a known Friedel-Crafts bromination, and the product obtained may contain different numbers of bromines depending upon the reaction. Preferred for the present invention are products which have an average of about 5 or more bromines per molecule, with those products containing an average of about 7 to about 9 bromines per molecule being of special interest because of their demonstrated applicability and their economic importance as fire retardants.

As noted above, another aspect of the invention is the fact that the brominated biphenyl can be heated in a solution or a slurry with a solvent. Of course, when the crystalline product is heated, this processing can be conducted in an atmosphere of air or an inert atmosphere, such as nitrogen, preferably at atmospheric or subatmospheric pressure. When the product is heated in a solvent, however, the solvent must have certain characteristics to give the most desirable results. It must be inert to the brominated biphenyl and it must not react with any of the colored impurities to deleteriously affect the color of the final product. Furthermore, it must be able to withstand the temperatures of the heat purification without substantial losses, and it must be readily separable from the desired product. Using these general criteria, solvents that have been found to be acceptable include ethylene dibromide, toluene and xylenes. Other solvents, however, are certainly known which would be acceptable in the present application.

SPECIFIC EMBODIMENTS

EXAMPLE 1—Heating in air

To a glass reactor was charged 500 ml. of methylene chloride, 38.55 g. of biphenyl and 2.5 g. of $AlCl_3$. The contents were cooled to 11° C. and 355 ml. of $Br_2$ was added at 3°–7° C. over two hours. One-half gram of $AlCl_3$ and 20 ml. of Br were then added and the temperature was increased to 40–42° C. for an additional 3.5 hours. The product recovered was tan solids covered with a half-inch of dark liquor. This product was stirred and 200 ml. of $H_2O$ containing 25 ml. of concentrated HCl was added. Fifteen minutes after the HCl addition, a 10% $NaHSO_3$ solution was added in a sufficient amount to neutralize the excess bromine. The product was suction filtered to give a salmon colored powdery product, which upon air drying at room temperature yielded 182 g. of brominated biphenyl having a melting range of 335°–347° C. and containing 78.9±2% Br and 2.2±0.3% Cl.

The product was placed in a 6" x 8" Pyrex tray and heated in an air oven at 140° C. for ¾ hour. The product was withdrawn, and it was visually observed that the color begun to disappear. Heating was continued on a hot plate until the balance of the salmon color was removed, leaving a good looking off-white solid.

EXAMPLE 2—Lower melting brominated biphenyl

In a manner similar to that of Example 1, a beige brominated biphenyl having a melting range of 235°–270° C. was prepared. The product was heated at about 110° C. until the brominated biphenyl became very white. The melting range was unchanged.

EXAMPLE 3—Melt color of purified brominated biphenyl

In a manner similar to that of Example 1, a beige brominated biphenyl having a melting range of 200° to 220° C. was prepared. The product was heated at 145° C. at 5 mm. Hg pressure until the color was white.

A sample of the treated product was melted and held at 300° C. for 10 minutes under a nitrogen atmosphere. The melt was cooled, and 1 gram of the solid was dissolved in 20 ml. of methylene bromide. The solution was used to fill a 1 cm. spectrophotometer cell, the percent absorbance was measured on a Beckman DU Spectrophotometer at 400μ and the reading was correlated to the APHA color standard. The solution had an APHA color of 68.

EXAMPLES 4–8—Heating in solvents

In the same manner as described in Example 1, brominated biphenyl was prepared. Portions of the solid were dissolved in various solvents and heated at reflux until the color was deemed desirable. The mixture was cooled and the product was separated and air dried at room temperature. The color was then visually observed. The results of these tests are shown in Table I.

TABLE I.—HEATING IMPURE BROMINATED BIPHENYL IN SOLVENTS

| Example | Solvent | Color of product | Remarks |
|---|---|---|---|
| 4 | Toluene | White | Good color. |
| 5 | Ethylbenzene | do | Color on melting of product was stable. |
| 6 | Dichlorobenzene | do | Stable product. |
| 7 | Chlorobenzene | do | |
| 8 | Benzene | Beige | Unstable color. |

In the same manner as shown by the examples above, biphenyl containing fewer bromines or biphenyl containing more bromines is heated in air or solvents to remove color and produce a white product.

I claim:
1. A process for decolorizing brominated biphenyl which has been prepared by reacting biphenyl with bromine or bromine chloride in the presence of a Friedel-Crafts catalyst, comprising heating the brominated biphenyl at a temperature between about 100° C. about 160° C. for a time sufficient to obtain a product of the desired whiteness.
2. The process of claim 1 wherein the reaction product is heated at a temperature between about 110° and about 150° C.
3. The process of claim 1 wherein the product is heated in air.
4. The process of claim 1 wherein the brominated biphenyl is heated in a solvent that is inert to the brominated biphenyl, is able to withstand the temperature without substantial losses and is readily separable from the brominated biphenyl.
5. The process of claim 4 wherein the inert solvent is selected from the group consisting of ethylene dibromide, toluene and xylene.
6. The process of claim 1 wherein the reaction product is a brominated biphenyl containing an average of about 5 or more bromines per molecule.
7. The process of claim 6 wherein the brominated biphenyl contains an average of about 7 to about 9 bromines per molecule.

References Cited

UNITED STATES PATENTS 3,232,959  2/1966  Hahn _____ 260—649 DP

FOREIGN PATENTS 1,264,427  3/1968  Germany _____ 260—649 DP
1,029,874  5/1966  Great Britain ____ 260—649 DP
1,161,547  1/1964  Germany _____ 260—649 DP

OTHER REFERENCES

Organic Synthesis, vol 31, John Wiley & Sons Inc., New York, 1951, p. 29–30.

HOWARD T. MARS, Primary Examiner